United States Patent Office 3,350,148
Patented Oct. 31, 1967

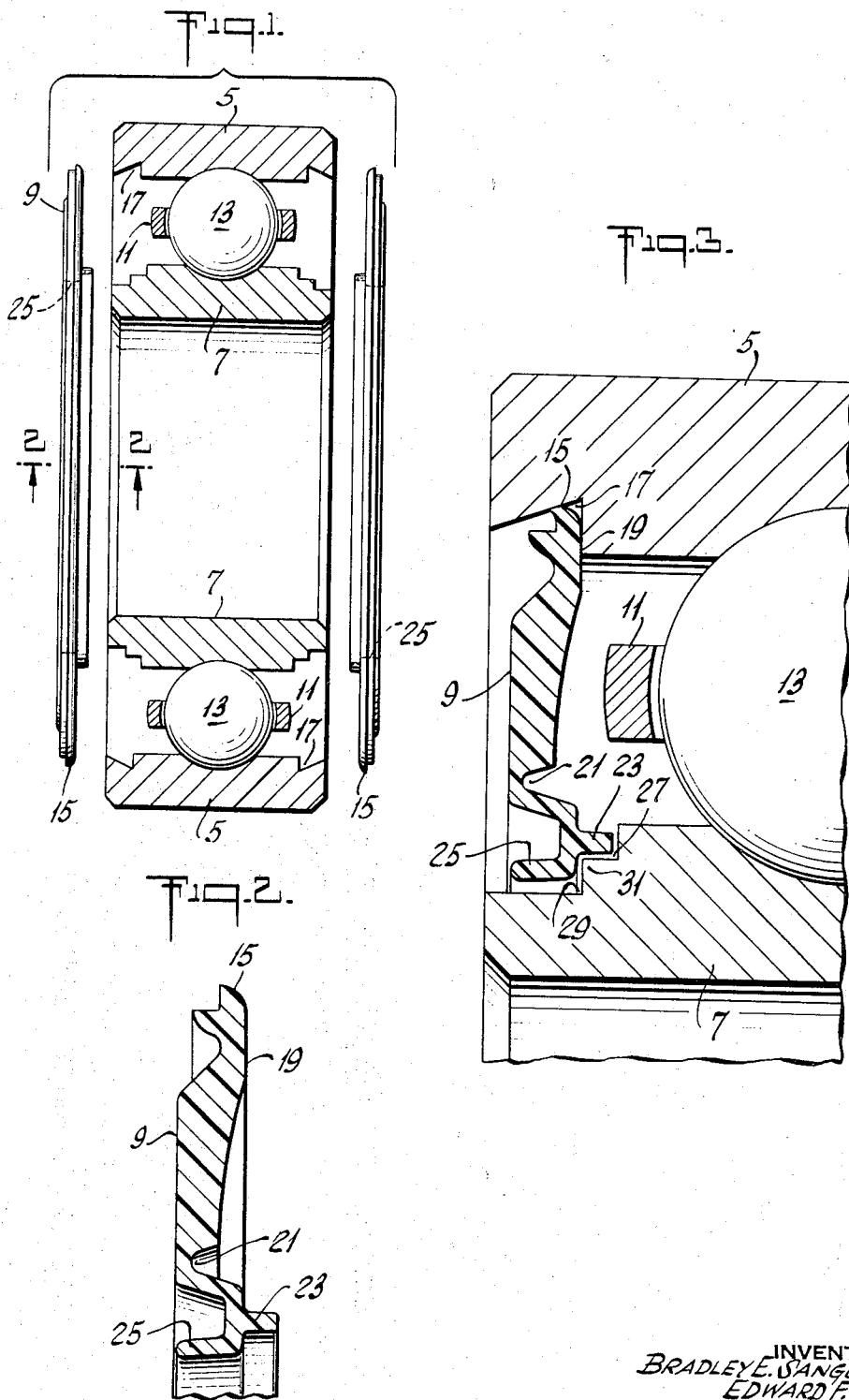

3,350,148
BALL BEARING SEAL ASSEMBLY
Bradley E. Sanguinetti and Edward F. Hayden, Northvale, N.J., assignors to General Bearing Co., West Nyack, N.Y., a joint venture
Filed Feb. 11, 1966, Ser. No. 526,855
3 Claims. (Cl. 308—187.2)

This invention relates to ball bearing assemblies and more particularly to sealed ball bearing assemblies.

A conventional prior art bearing assembly comprises inner and outer cylindrical races. A series of balls is disposed between the outer surfaces of the inner race and the inner surfaces of the outer race. The balls may be separated by a retainer or separator. This construction allows the inner and outer races to rotate easily with respect to each other, particularly if the assembly is lubricated.

One of the most difficult problems to overcome in the design of any bearing is to insure that dirt and dust are kept out of the bearing interior and the lubricant is kept inside. A dust-free bearing can be obtained by attaching a shield or seal to each side of the bearing. The two seals or shields have inner and outer circular edges attached to the respective inner and outer races. Because the inner and outer races rotate with respect to each other there arises a rubbing pressure against the seals or shields. The term "shield" is generally used to define a closure device which is securely attached to the outer race, but is free for relative movement with respect to the inner race. The resulting assembly is one which does not eliminate the dirt problem; but helps in keeping out large particles of dirt and other foreign material. The term "seal" is generally used to define a closure device which fits snugly against the inner race as well as the outer race. The resulting seal is much better and almost no dirt gets into the interior of the bearing. However, because there is considerable friction along the edges of the seal, the amount of torque required to rotate the bearing increases with a corresponding increase in the operating temperature of the bearing. If the inner race rises in temperature more than the outer race, it expands to a greater extent and the bearing will bind. If the outer race arises in temperature more than the inner race, the bearing will become loose and the smooth rolling action of the device will be lost.

It is a general object of this invention to provide a simple ball bearing seal assembly which has the advantages of both conventional "seal" and "shield" assemblies.

Briefly, in accordance with the principles of our invention, the outer surface of the inner race is provided with a double step, or two annular ridges of different diameters. The inner edge of the seal is provided with two flanges which fit against the double step. The outer edge of the seal is rigidly secured by a snap fit to the outer race. The seal moves with the outer race. The inner edge of the seal rotates with respect to the outer surface of the inner race. There is a minimum amount of friction between the seal and the inner race because of the clearance fit between these two elements.

Although there is a clearance fit, dust cannot enter the interior of the bearing. The step passageway operates as a pump and by capillary action the lubricant inside the bearing is forced into the region between the seal flanges and the inner race steps. The lubricant not only allows the seal to rotate with respect to the inner race with a minimum amount of friction, but in addition blocks the passageway through which dirt would otherwise enter the bearing. The step structure also allows seal radial and axial displacements as the temperature of the bearing changes in use and as the bearing undergoes various stresses. This free radial and axial movement is obtained because the thickness of the lubricant between the seal flanges and the inner race steps can change as the parts change dimensionally. No matter how the dimensions change, the pumping action of the lubricant continues to block the entry of any dirt or dust.

It is a feature of this invention to provide a double step around both edges of the outer surface of the inner race of a bearing assembly.

It is another feature of this invention to provide in a bearing assembly one or two seals each having an outer edge which is securely attached to an edge of the inner surface of the outer race, and a double flange inner edge which fits relatively loosely against a double-step outer edge of the inner race.

It is another feature of this invention to place a lubricant such as grease inside the bearing assembly, which lubricant is forced by capillary action to flow into the double-step region between each seal and the inner race as the bearing rotates.

It is still another feature of this invention to provide each seal with a V-shaped ridge around its interior surface to facilitate the bending of the seal and its attachment to the inner and outer races.

Further objects, features and advantages of the invention will become apparent upon consideration of the following detailed description in conjunction with the drawing, in which:

FIG. 1 is a cross-sectional view of a ball bearing assembly in accordance with the principles of the invention, the two seals however being shown in plain view;

FIG. 2 is a cross-sectional view of one of the seals in FIG. 1 taken along the line 2—2; and FIG. 3 is an exploded cross-sectional view of the upper left-hand portion of FIG. 1, with the seal shown in place.

Referring to FIG. 1, the bearing assembly includes an inner race or ring 7 and an outer race or ring 5. A plurality of balls 13 fit between the two races; the balls may be separated by retainer 11. Two seals 15 are provided for snapping onto the bearing assembly. The seals should have high strength and rigidity properties. The material Delrin, manufactured by the Du Pont Company, has been found particularly advantageous.

A cross-section of the left-most seal in FIG. 1 is shown expanded in FIG. 2. The outer edge 15 is a conventional snap fit. The inner edge comprises two flanges 23 and 25. The annular V-shaped ridge 21 is provided to facilitate the bending of the seal in order that it be snapped into place with minimum ease.

The seal is shown in place in FIG. 3. At the edge of the inner surface of the outer race is a groove 17. Snap fit 15 snaps into this groove. Outer edge 15 is bent slightly when the seal is in place and surface 19 fits flush against the outer race in the groove. This conventional fit provides a secure attachment of the seal to the outer race. The seal rotates together with the outer race and the tight fit prevents dirt from entering the bearing.

The edge of the outer surface of inner race 7 has a double-step shape. This is shown by corners 27, 29 and 31. Flanges 23 and 25 conform to this shape but when the seal is in place, the flanges do not fit snugly against the inner race. Instead, a small passageway is formed. The passageway is small enough in width such that a capillary action is provided. As the bearing rotates the lubricant which is included inside the assembly is pumped out through the passageway and fills the region between the seal flanges and the inner race steps. The lubricant in the clearance between the seal and the race prevents dirt particles from entering the bearing interior. In the event that it is necessary to lubricate the bearing after it has been used for a considerable period of time, because there is a clearance between the seal and inner race additional lubricant may be pumped in.

The two flanges 23 and 25 are relatively thin in the illustrative embodiment of the invention. Because of this they are flexible and in the event the inner race should be forced against the seal, the flanges may bend without breaking the seal. The V-shaped groove 21 also contributes to the flexibility of the seal. The groove allows the seal to be bent around it and facilitates the snapping on of the seal to the bearing assembly during its construction.

It should also be noted that the clearance between the seal and the inner race offers an additional advantage. Because there is both radial and axial clearance between the seal and the inner race, the closure is not affected by variations in temperature. Also, the tolerances required in the construction of the inner race are not strict because clearance between the seal and the race is desired.

The double flange and double step construction in the illustrative embodiment of the invention provides great flexibility, and the capillary action which in turn results in a relatively frictionless yet dirt-free seal. The flanges and steps have been found sufficient but it is possible, of course, to include additional ones on the seal and inner race. Thus, it is to be understood that the embodiment described is merely illustrative of the application of the principles of the invention. Numerous modifications may be made therein and other arrangements may be devised without departing from the spirit and scope of the invention.

What is claimed is:

1. A bearing assembly comprising an inner race having inner and outer surfaces; an outer race having inner and outer surfaces; a plurality of balls disposed between the inner surface of said outer race and the outer surface of said inner race; a plurality of step annular ridges around at least one end of the outer surface of said inner race; an annular ridge around at least one end of the inner surface of said outer race; and at least one seal ring having a snap-fit outer edge and a plurality of step annular flanges adjacent the inner edge, said annular flanges conforming with said step annular ridges, said seal ring being dimensioned such that with said seal snap-fit outer edges snug against said outer race annular ridges a clearance is provided between said seal annular flanges and said inner race step annular ridges whereby lubricant inside the bearing assembly is forced by capillary action into said clearance as said bearing is rotated.

2. A bearing assembly in accordance with claim 1 wherein said seal rings each further includes a V-shaped annular ridge between the respective snap-fit outer edge and the inner edge annular flanges.

3. A bearing assembly comprising an inner race having inner and outer surfaces; an outer race having inner and outer surfaces; a plurality of balls disposed between the inner surface of said outer race and the outer surface of said inner race; at least one end of the inner surface of said outer race containing an annular ridge; at least one end if the outer surface of said inner race containing at least two annular ridges of different diameters; and at least one seal ring having a snap-fit outer edge and an inner edge conforming to said annular ridges of different diameters, said seal ring being attached to the ends of said inner and outer races and being dimensioned such that a lubricant passageway is provided between said inner race annular ridges of different diameters and said seal inner conforming edge.

References Cited

UNITED STATES PATENTS

| 1,917,987 | 7/1933 | Large | 308—187.2 |
| 2,054,581 | 9/1936 | Delaval-Crow | 308—187.1 |
| 2,101,013 | 11/1937 | Leister et al. | 308—187.1 |
| 2,705,654 | 4/1955 | Saywell | 277—94 X |

FOREIGN PATENTS

| 212,778 | 2/1958 | Australia. |

MARTIN P. SCHWADRON, *Primary Examiner.*

ROBERT A. DUA, *Examiner.*